(12) United States Patent
Saafi

(10) Patent No.: US 11,979,623 B2
(45) Date of Patent: May 7, 2024

(54) SYSTEMS AND METHODS FOR PREDICTING TELEVISION VIEWERSHIP PATTERNS FOR ADVANCED CONSUMER SEGMENTS

(71) Applicant: DISCOVERY COMMUNICATIONS, LLC, Silver Spring, MD (US)

(72) Inventor: Diana Saafi, Silver Spring, MD (US)

(73) Assignee: DISCOVERY COMMUNICATIONS, LLC, Silver Spring, MD (US)

( * ) Notice: Subject to any disclaimer, the term of this patent is extended or adjusted under 35 U.S.C. 154(b) by 127 days.

(21) Appl. No.: 17/540,932

(22) Filed: Dec. 2, 2021

(65) Prior Publication Data
US 2022/0256219 A1  Aug. 11, 2022

Related U.S. Application Data

(60) Provisional application No. 63/120,468, filed on Dec. 2, 2020.

(51) Int. Cl.
  *H04N 21/258* (2011.01)
  *H04N 21/25* (2011.01)
  *H04N 21/81* (2011.01)

(52) U.S. Cl.
  CPC ..... *H04N 21/25883* (2013.01); *H04N 21/252* (2013.01); *H04N 21/25891* (2013.01); *H04N 21/812* (2013.01)

(58) Field of Classification Search
  CPC ........... H04N 21/25883; H04N 21/252; H04N 21/25891; H04N 21/812; H04N 21/2668; G06Q 30/0202
  See application file for complete search history.

(56) References Cited

U.S. PATENT DOCUMENTS 8,789,092 B2 * 7/2014 Kitts .................. H04N 21/4532
                                                        725/35
10,841,651 B1   11/2020 Karnezos
                    (Continued)

OTHER PUBLICATIONS

Clark, "Who's Watching TV?" New York University—Stern School of Business, Oct. 24, 2016, retrieved on [Feb. 7, 2016]. Retrieved from the internet <URL: https://archive.nyu.edu/bitstream/2451/36731/2/wwtv_workingpaper.

*Primary Examiner* — Nathan J Flynn
*Assistant Examiner* — Christine A Kurien
(74) *Attorney, Agent, or Firm* — Bookoff McAndrews, PLLC

(57) ABSTRACT

Systems and methods create new viewership estimates to drive linear ad schedule optimizations. The systems use machine learning techniques to predict granular-level television viewership metrics for any consumer segment measurable at a national level. The systems provide capabilities beyond merely estimating and forecasting television viewership for age- and gender-based demographic segments. The systems accurately estimate viewership for any consumer segment, including behavioral, demographic, and other segmentation techniques and provide reliable viewership predictions. The systems model viewership by training an ensemble of machine learning models using historical consumer segments data and TV viewership data. The models work in concert to create viewership predictions, which are ingested, transformed, and processed and then used for determining and pricing advertising sales based on predicted viewership for advanced segments, for pacing forecasts and pre-actuals in a campaign stewardship program, and for further model training in an optimization engine.

23 Claims, 5 Drawing Sheets

(56) References Cited

U.S. PATENT DOCUMENTS

| | | | |
|---|---|---|---|
| 2012/0042338 A1* | 2/2012 | Kitts | H04N 21/435 725/35 |
| 2014/0109123 A1* | 4/2014 | Balakrishnan | H04N 21/25435 725/14 |
| 2015/0189351 A1* | 7/2015 | Kitts | H04N 21/23424 725/19 |
| 2016/0134934 A1* | 5/2016 | Jared | G06Q 30/0203 725/14 |
| 2017/0161773 A1* | 6/2017 | Xu | G06Q 30/0243 |
| 2018/0109829 A1* | 4/2018 | Epstein | H04H 60/66 |

* cited by examiner

FIG. 1    Foresite System (Cloud) Architecture and External Interfaces

FIG. 2   Computer System

Data and Models Flowchart

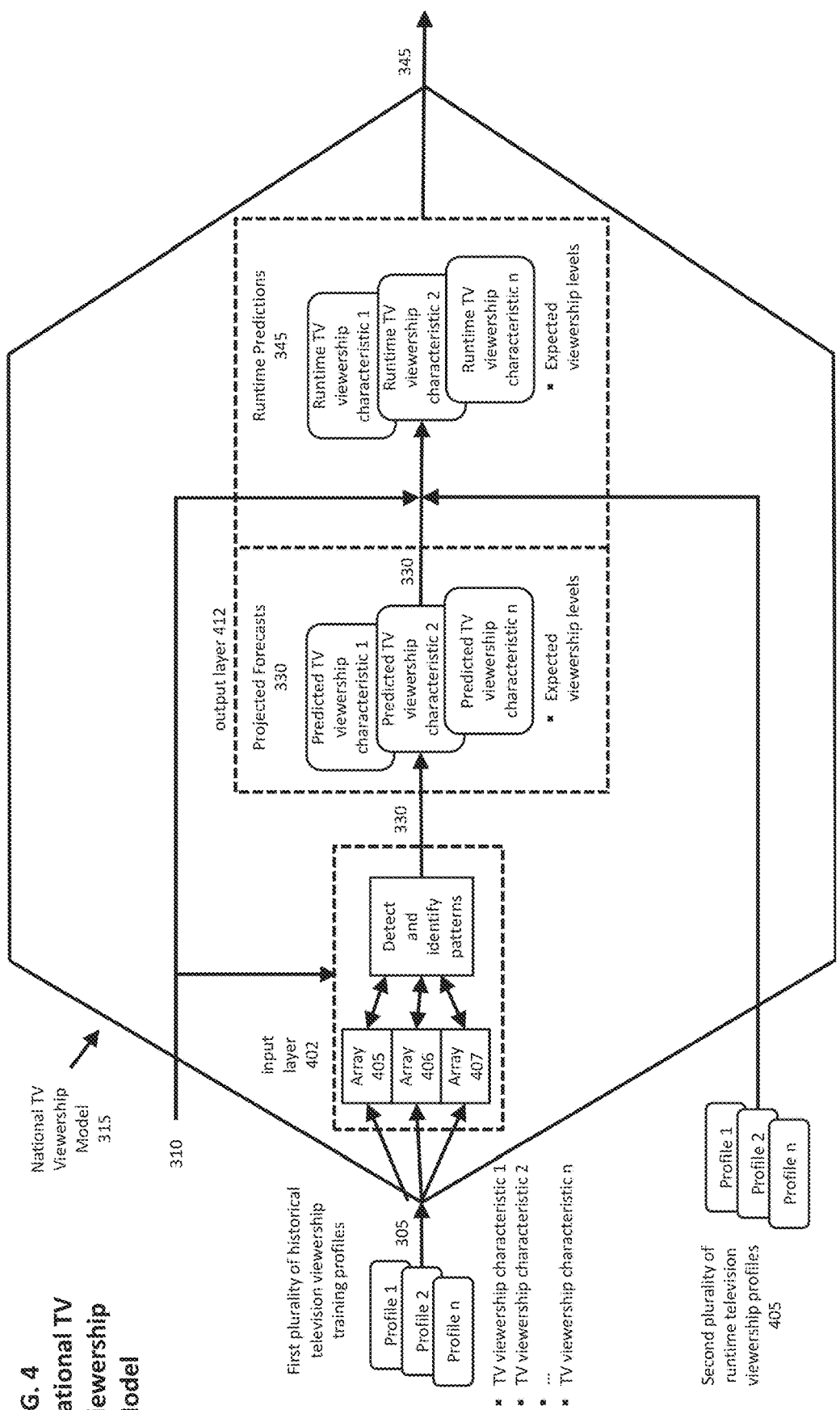

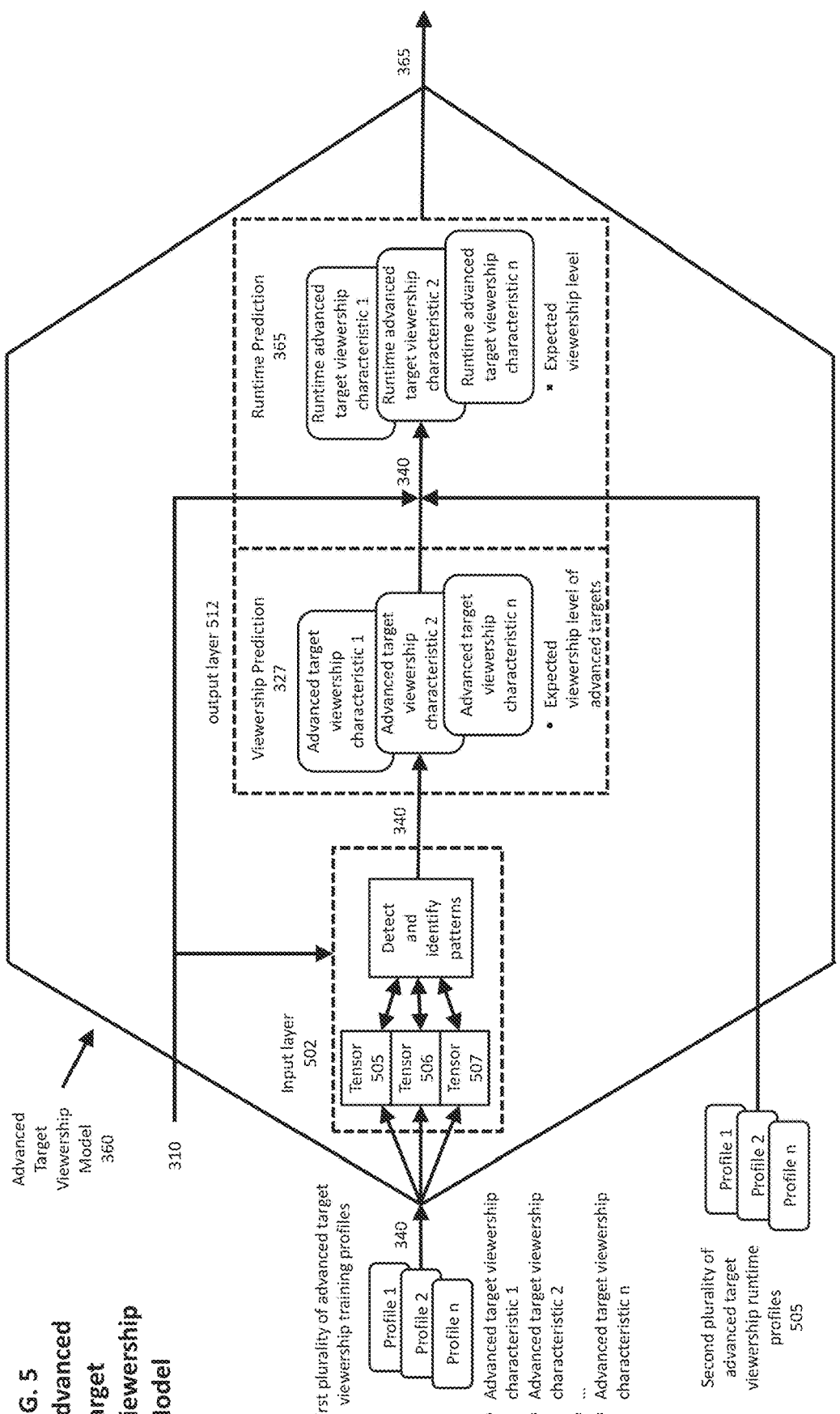

SYSTEMS AND METHODS FOR PREDICTING TELEVISION VIEWERSHIP PATTERNS FOR ADVANCED CONSUMER SEGMENTS

CROSS-REFERENCE TO RELATED APPLICATION

This application claims benefit of priority from U.S. Provisional Application No. 63/120,468 filed on Dec. 2, 2020, the entire contents of which are incorporated by reference.

TECHNICAL FIELD

The invention relates to systems and methods of using video program viewer interaction measurements to determine audience segment viewership and more specifically to machine learning systems and methods for predicting television viewership patterns for advanced consumer segments.

BACKGROUND

Since replacing the radio as the most popular mass medium, the television industry continues to evolve from its black-and-white beginnings to cable TV, digital TV, satellite broadcasting, and smart televisions. Viewer choices for television and video content continue to increase. The success of a television show in an increasingly technological society is a vast multi-variable formula.

To better reach viewers, service providers such as broadcast, cable, satellite, and streaming television companies need to accurately measure audience viewership in different segments including video programs, video program airings, video program airing segments, demographic groups, geographic groups, and viewing device types. To capture and characterize viewership accurately, the different viewing measures need to include multiple types of viewing formats such as Linear TV, Digital Video Recording and Playback, Video on Demand, and streaming services.

Television advertising remains one of the most effective ways to create awareness about a product or brand, and in the United States, television advertising consistently delivers the highest rate of return of all media investment. Sellers strive to make a strong impression on viewers so that those viewers will remember their products when they become customers and are ready to buy. Brands and media companies work to match the demographics of the viewers of each show to the market for each particular product being sold. The popularity of the program and the number of times the advertiser chooses to air the advertisement have an impact on the total cost of running the advertisement. Therefore, both the decision to purchase television advertisement time and the cost of that time are influenced by a television program's predicted viewership performance. Consequently, the prediction and analysis of television audience sizes and characteristics continues to be an important determinant of advertisement pricing and effectiveness.

One system of measuring and predicting television audiences is the Nielsen Ratings system. Nielsen ratings are determined by measuring the number of viewers of a television program at a particular time. Nielsen ratings use audience measurement systems to determine the size and characteristics of the audience. Historically, the Nielsen ratings have been the primary source of audience measurement information in the television industry. This measurement information affects television schedules, advertising rates, the viability of particular shows, and other aspects related to the program (content). The Nielsen system has expanded from focusing only on program content to analyzing the advertisements themselves, where Nielsen ratings are provided for the individual advertisements.

Because the advent of linear television preceded big data and digital technologies by many decades, its advertising measurement and currency ecosystem developed with an emphasis on reaching broad viewership populations, typically defined by simple age and gender brackets. Research organizations such as Nielsen manage TV viewership panels, for which participants are carefully selected according to their age and gender (and other attributes) to provide a statistically representative sample of the U.S. population. The TV viewership behaviors of these nationally representative panelists are then monitored, measured, and projected to national numbers based on age and gender groupings. For example, viewership of a commercial airing on a particular cable TV network at 8:15 pm on Wednesday may be measured by Nielsen as having captured a projected 500,000 views ("Impressions") by males between the ages of 50 and 54. This is an example of the type of age/gender demographic target that the linear TV media industry has historically used as currency, transacting with advertisers against guarantees of forecasted age and gender impressions.

Given the lucrative TV advertising transactions against age and gender viewership targets, the methods, practices, organizations, and tools for forecasting age and gender viewership have also been well-developed over the past decades. Such practices typically begin with recent historical age and gender viewership data, which are then aggregated and averaged in ways that create demand from advertisers. For example, females and males within all of the adult age sub-brackets may be combined together to form an attractive age/gender demographic segment referred to as "Persons 18+". This segment's viewership can be aggregated in many ways, for example, as 8 pm to 12 Midnight on each Wednesday of the 4th Quarter of last year. Taking the average viewership at any given minute over this time period is a simple method of forecasting this year's "Wednesday Primetime" viewership ("Estimate") for Persons 18+. These Estimates can then be sold to advertisers as guarantees that their ads will reach the estimated number of impressions for this age/gender segment on Wednesday at Primetime.

In the past, advertisers and networks have used Nielsen ratings (and similar ratings agencies) and the typical pricing metric of CPM (or cost-per-thousand—a barometer of the cost of reaching 1,000 viewers). The viewers counted within this pricing metric have traditionally been based on the broad age/gender segments discussed above. A shift has occurred as advertisers begin to place a premium on targeting alternative types of audiences containing select viewers more aligned with each advertiser's specific business goals.

Additionally, as big data and digital technologies have grown in importance within the advertising industry, particularly over the past two decades (with digital-native companies like Google and Facebook yielding growing shares of total advertising spend), they have also brought about new methods of advertising targeting. While linear television historically focused on reaching broad age/gender demographic targets using statistical panel-based methods like those described above, digital media facilitates the targeting of individuals at a more direct and granular level, using deterministic methods that leverage large sets of individual-level behavioral, demographic, and consumer data. Such methods allow advertisers to reach more narrowly defined consumer segments ("Advanced Targets" or "advanced consumer segments") than the broad age/gender segments. As an example, an automaker advertiser may be more interested in targeting a specific Advanced Target made of up people who are currently in the market to buy a car, as opposed to a broad segment of Persons 18+, many of whom may not be interested in car purchases at this time.

This shift has brought about challenges in estimating the television viewership of such Advanced Targets, as existing data and measurement infrastructures have failed to evolve quickly to enable these types of advertising campaigns. A fundamental challenge in estimating Advanced Target TV viewership is the development of forecasting methodologies that minimize predictive error within a wider television media ecosystem that was not originally developed to support the targeting or measurement of narrow custom audiences. This core challenge is driven by both practical and statistical sources of error and the inability of prior computer systems to adequately address the errors.

From a practical standpoint, the main providers of television viewing measurement were not set up to easily provide viewership metrics for custom audiences outside of the discussed age/gender segments. Certain methods made use of the widely-available age/gender viewership data, applying estimated proportional factors in order to approximate the requisite viewership levels for smaller Advanced Target audiences. Systems and methods such as these introduce additional forecasting error, compared to the underlying age/gender forecasts, because they are not based on the direct measurement of historical Advanced Target viewership. In addition, the established data infrastructures within the television advertising industry made the retrieval and processing of historical Advanced Target viewership data challenging and time consuming, further hindering the development of more precise estimation methods.

As to the statistical sources of predictive error, we must understand that Advanced Target segments are typically smaller than the age/gender segments of the U.S. population traditionally targeted by TV advertisers. Thus, the representation of such smaller groups within a statistical viewership panel is also of a smaller sample size. Smaller sample sizes introduce wider margins of error, which is coupled with lower confidence in viewership forecast estimates. Relatedly, any incremental error in an estimate for a smaller audience represents a larger proportion of that actual audience than would be the case for an incremental error for a larger audience. As an example, an Advanced Target impression estimate that is off by one impression for an audience size of 50 will represent 2% of that audience size, whereas a traditional age/gender impression estimate that is off by one impression for a larger audience size of 100 will represent 1% of that audience. Precision of estimates for these small audience targets is both challenging and essential.

A number of systems and methodologies have been tried to improve the forecasts generated from the simple existing estimation methods mentioned above. These conventional approaches rely on systems that results that fall short of the levels of precision needed to confidently deliver Advanced Target TV advertising campaigns and to minimize wasteful ad placements that ultimately deliver too many or too few Advanced Target views. Solutions currently available do not produce the nuanced results needed in the individual markets and in the individual advanced target segments.

Existing systems do not include adequate workflows for data processing, automation, model ensembles, or distributed modeling necessary to support more advanced forecasting techniques and instead implement solutions based on workflows established to support the traditional age/gender measurement and forecasting systems. For example, the viewership forecasts for an advanced target is directly based on, and linearly correlated with, the forecasts of age/gender estimates, and not principally based upon real past viewership numbers for the underlying target segment.

Existing systems also experience problems with faulty pacing estimates for Advanced Target television ad campaigns. Forecasts in the current status quo ecosystem have been provided only prior to a campaign, without being updated throughout a running campaign based on fresh incoming viewership data. There is a need for reliable updates to estimates during a campaign in order to support more agile and accurate decision-making in cases where changes to a currently-running campaign may be necessary due to errors in pre-campaign forecasts.

SUMMARY

Prior technical efforts often focused on quantity of advertisements and a wide audience, while the systems and methods of the invention provide focused advertising that attract a viewership most closely aligned with relevant target consumers.

Previously, advertisers transitioning from linear media to online media attempted to segment viewers using conventional segment characterizations. One target segment, for example, is "males from 25 to 34 years old." Linear media channels (e.g., broadcast channels, etc.) measure their advertising effectiveness with such a segment using surveys, but the statistics from the surveys apply only to broad classes or groups of fungible viewers. Using artificial intelligence machine learning servers and training models, the systems and methods in accordance with the invention identify, measure, and characterize much more granular audience segments. The accuracy of these determinations enables a more focused advertising campaign than previously possible along with the ability to fine-tune advertising campaigns (e.g., for performance with respect to fine-grained advanced targets). Tuning such a campaign in midstream has presented significant problems in the past, including the ability to come up with modeling techniques that can adaptively find and target similar viewers. Additionally, the advanced targets may change over the course of the campaign, and prior systems have been incapable of learning, adapting, and shifting focus as the models learn more about the granular audience segments.

Newer targeting capabilities originating from digital media have created a demand for reaching Advanced Targets, in addition to the well-established age/gender segments, on linear television advertising. This is a challenging problem that requires technical innovations in many different aspects of the linear television ecosystem including, but not limited to, audience measurement, data and technology infrastructures, and forecasting methods.

In response to existing challenges, the inventor recognized that machine learning techniques may be applied to viewership predictions and to segmenting advanced targets to create accurate and robust viewership estimates that go beyond human-derived judgements and other existing methodologies. More specifically, the inventor devised techniques for training various types of computational machine learning predictors ("ML Predictors") to recognize time-sensitive television viewership results from examples of previous viewership and segments, and to then apply the learned examples to new segments and target demographic data as they become available.

Acknowledging the wider scope of the technology problem landscape, in one example implementation of the invention, the inventor narrowly focused on methods and systems to forecast Advanced Target viewership on linear television for use in TV advertising transactions and campaign planning. From a data perspective, these methods make use of a combination of traditional linear TV viewership data and large data sets of highly granular Advanced Target viewership, along with large-scale national consumer segments measurements. In terms of forecasting methods, a combination of modeling algorithms is used to produce the Advanced Target viewership forecasts of the invention. Finally, given the large size of data sets, the systems are built within a cloud infrastructure to facilitate automatic scaling and modeling on distributed computational clusters.

The inventor developed example systems, including various forms of computational ML Predictors and associated algorithms implemented on one or more computing devices (e.g., servers), that may be applied in runtime to historical viewership determinations to automate projected national television forecasts. The example systems may then store the forecasts with respective sets of runtime inputs, and subsequently make them available to a variety of applications that use or need them. The runtime inputs may be stored as metadata or in other forms, described below. In addition to automating the forecasting, the example systems and the example methods they carry out may also computationally determine statistical confidence levels of the forecasts, enabling quantitative evaluation of forecasts and forecast inputs generated by the systems. In some embodiments, determination of confidence levels may be considered integral to determining forecast characteristics.

Workflows using the invention are automated and pull from many different systems, servers, and information sources. The granular determinations allow accurate pacing estimates for television ad campaigns targeting advanced (non-age/gender-based) consumer segments.

Example embodiments of systems and methods for automated viewership forecasting using a machine learning predictor program are described below. In the discussion, the term "ML Predictor" will be used as an abbreviation for "machine learning predictor." The ML Predictor program may generate predicted viewership forecasts for any given historical input. Training viewership models associated with respective sets of historical viewership measures may be input to the ML Predictor, and the ML Predictor program may be trained to predict viewership forecasts based on expected viewership levels. At runtime, the trained ML Predictor program may be applied to runtime viewership inputs to generate respective sets of runtime forecasts corresponding to different temporal and demographic characteristics of the runtime inputs. The runtime inputs may be stored with information indicative of the respective sets of forecasts. Runtime forecasts and their associated predicted viewership characteristics may be reviewed in real time and/or at a later time either manually or in an automated operation.

The systems and methods in accordance with the invention provide a novel technical solution to problems of prior systems in identifying advanced target advertising segments and predicting television viewership metrics, including impressions, ratings, reach, network coverage universe estimates (UE), estimates of a total population of viewers (UE), and other audience measurements. for those targeted segments. The invention incorporates artificial intelligence models that are trained and optimized to segment advanced targets on a granular level and to identify segments at speeds and scales impossible not possible with human analysis. The invention provides automated systems and methods of receiving and characterizing historical television viewership, training artificial intelligence time series predictive viewership models, and forecasting television viewership and ratings projections using the models. The invention then takes these forecasted results and combines them with newly identified consumer segments and target demographic information. The combination is then used as an input, along with past historical viewership information, to train consumer segment viewership models. The consumer segment viewership models in accordance with the invention then predict viewership metrics for the advanced target consumer segments. With these predictive results tied to advanced target consumer segments, advertisers can focus on specific matching of advertising messages with the correct potential buyers.

The invention includes a series of specially-configured computer servers trained and optimized to predict granular-level television viewership metrics for any consumer segment that can be measured at a national level. As outlined above, prior methods and systems for estimating and forecasting television viewership based on age- and gender-based demographic segments often provide incomplete and inaccurate information. The systems in accordance with the invention, by contrast, expand current methods and systems for estimating and forecasting television viewership for any consumer segment, including behavioral, demographic, and other segmentation techniques. The use of machine-learning artificial intelligence by the computer system represents a significant technical improvement over conventional forecasting solutions. Not only is the machine-learning artificial intelligence expected to produce better results in terms of more accurate advanced targeting assessments of consumer segments, but perhaps more importantly, the machine-learning artificial intelligence is highly amenable to adapting itself to new forms of advanced targeting. The methods applied by this engine include mathematical algorithms for modeling historical viewership patterns and predicting viewership forecasts. In addition, the system can be cloud-based and automated, with data pipelines that automatically ingest viewership and customer segment data, process that data for modeling, train models, and finally, calculate and store viewership predictions.

While media companies and advertisers rely on TV ratings and other viewership metrics every day to measure the success of TV shows, verify that their audience size and composition are delivering against media-buy targets, and make-good in case the numbers come up short, media companies and advertisers also use ratings to predict the future, and accurate viewership predictions set and move advertising rates before and during advertising campaigns. The systems and methods for predicting television viewership patterns for advanced consumer segments in accordance with the invention solve problems of faulty pacing estimates for TV ad campaigns targeting advanced (non-age/gender-based) consumer segments. The developed invention provides systems and methods that not only allow the creation of these estimates internally, but also adapt and learn and improve upon the accuracy of the predictions. The systems and methods of the invention provide data-driven linear ad sales teams with timely campaign (pacing) information to predict campaign exposure on an ongoing basis for the advanced viewership segments that their ad campaigns targeted. In short, the invention provides reliable viewership predictions throughout a campaign.

The performance of this invention was tested against existing estimates from the incumbent method of advanced segment viewership estimates, and the systems and methods of the invention outperformed the existing estimates. A sample of recent quarterly advanced advertising campaigns that ran in the first quarter of 2020 was selected. Each of these campaigns focused on a different advanced target with widely differing demographic characteristics, and the commercials for each campaign were aired across multiple cable television networks throughout a variety of different times of day over the course of the first three months of 2020. The estimated viewership Impressions forecasted prior to campaign start dates using the incumbent method ("$F_{incumbent}$") were also collected, along with levels of actual viewership Impressions measured after campaign completion ("A"). The invented methods and system were then used to generate post-hoc forecasts of Impressions for each campaign ("$F_{new}$"). To measure forecasting performance for the given forecasting methods, the test relied on Mean Absolute Percentage Error ("MAPE") and a weighted version of the same, Weighted Absolute Percentage Error ("wMAPE") calculated as follows:

$$MAPE = \frac{100\%}{n} \sum_{t=1}^{n} \left| \frac{A_t - F_t}{A_t} \right|$$

$$wMAPE = \frac{\sum_{t=1}^{n} |A_t - F_t|}{\sum_{t=1}^{n} |A_t|}$$

where n represents the number of campaigns tested, F represents a vector of forecasted campaign impressions using either the incumbent or new method, and A is the vector of actual viewership Impressions garnered by each completed campaign. As a measure of performance, a lower MAPE or wMAPE value would represent better predictive performance. In this test, the incumbent method produced a MAPE of 40%, while the newly invented method and system produced a MAPE of 1%, or 39 percentage points better. In wMAPE terms, the incumbent method produced 31%, while the newly invented method and system produced 9%, or 23 percentage points better predictive performance. Using either metric, the new method and system perform advanced target forecasting significantly better than existing methods.

On a revenue basis, these percentages can represent millions of dollars in cost savings for a company, and the savings scale with revenue increases. The invention provides the foundation for better stewardship and pacing for data-driven linear ad campaigns, for which internal viewership estimates for advanced consumer segment targets has traditionally lacked.

BRIEF DESCRIPTION OF THE DRAWINGS

FIG. 4 illustrates additional details of the training and runtime prediction aspects of the national television viewership models in accordance with the invention.

FIG. 5 illustrates additional details of the training and runtime prediction aspects of the advanced target consumer segment viewership models in accordance with the invention.

DETAILED DESCRIPTION

The invention includes specially-configured computer systems and methods that provide automated process improvements of viewership estimation for advanced consumer segments. The invention utilizes a unique approach to modeling viewership through the training of an ensemble of mathematical machine learning predictor models that work together to create the predictions of viewership at various time intervals and at various granular segments.

System Architecture

Figure 1:
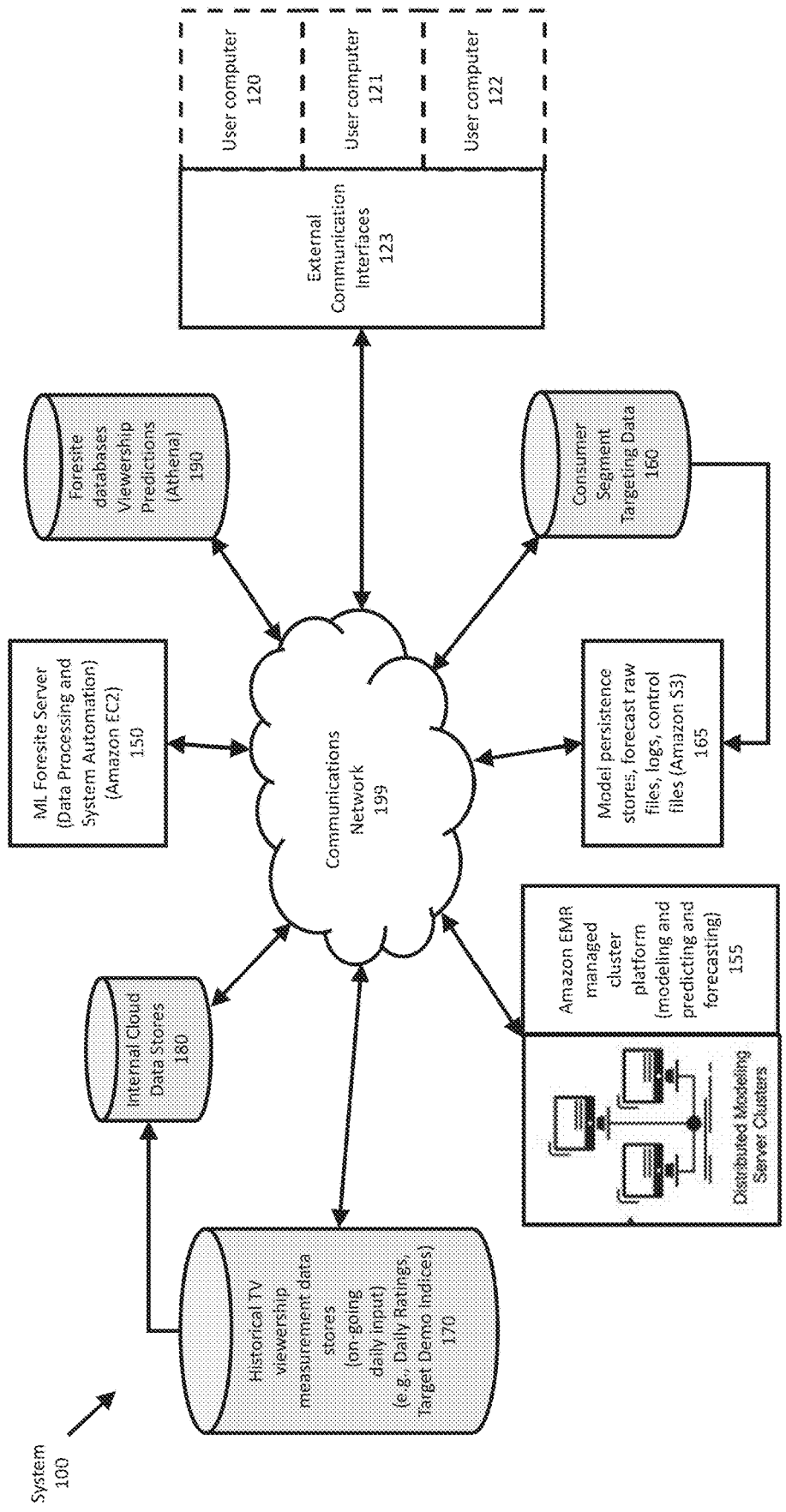
FIG. 1 shows an example system (cloud) computer architecture and external interfaces in accordance with the invention.

FIG. 1 shows one example system (cloud) computing architecture and external interface in accordance with the invention. This example computer architecture of the system shows cloud accounts and the manner in which the systems interface with external data providers and end users. The system's cloud footprints ingest data from TV viewership measurement vendors' data stores, and then process the data with cloud servers that handle data processing and system automation. Those servers are responsible for controlling the creation of other servers and server clusters that handle automated jobs such as distributed modeling, transfer and transformation of data, persistence of models, etc. The system also ingests and receives consumer segment data, which runs through the persisted models to create viewership predictions. These predictions become available for use in other external systems via an external communication interface. The system components shown in FIG. 1 appear as a variety of servers, databases, communication interfaces, and computers, and while the components are shown as a particular icon representing a computer component (e.g., TV viewership measurement data stores 170 is shown as a database icon), these computer components may include additional computer elements/modules/components as outlined below with regard to FIG. 2.

FIG. 1 provides a simplified block diagram of an example machine learning (ML) Foresite viewer system 100 that may be applied to predicting viewership for advanced consumer segments. The ML Foresite system 100 can include various components, which may be implemented as or in one or more computing devices (e.g., servers) and a communication network 199. Communications network 199 is the medium used to provide communication links between several devices and computers connected together within the system 100. Communications network 199 can include connections, such as wire, wireless communication links, or fiber optic cables from individual clients, servers, databases, sources of data, and processing components. The clients, servers, data, and processing components can access the communication network 199 using a variety of software architectural frameworks, web services, file transfer protocols, and Internet exchange points. Communications network 199 can represent a collection of networks and gateways that use the Transmission Control Protocol/Internet Protocol (TCP/IP) and other communication protocols, as well as application programming interfaces (APIs), to communicate with one another and with devices connected to the network 199. One example communications network 199 includes the Internet, which can include data communication links between major nodes and/or host computers, including thousands of commercial, governmental, educational, and other computer systems that route data and messages. FIG. 1 is one example of an environment of an exemplary embodiment of the invention and is not an architectural limitation for different illustrative embodiments of the invention.

Clients and servers are only example roles of certain data processing systems and computer systems connected to communications network 199, which do not exclude other configurations or roles for these data processing systems.

In FIG. 1, Foresite server 150 connects to data exchange (communications) network 199 along with TV viewership measurement data stores 170, internal cloud data stores (dB) 180, distributed modeling server clusters 155, Foresite database 190, consumer segment targeting dB 160, and model persistence stores 165, all of which can include servers, databases, processors, and the necessary software and hardware to execute applications and methods for training viewership models and consumer segment models and for forecasting television audiences and predicting viewership for advanced consumer segments. In addition, system set up information, metadata, as well as other files and data to execute applications and methods of the invention, reside on the computer systems 150, 155, 160, 165, 170, 180, and 190 in system 100. Software applications can execute on any computer in the system 100. User computers (e.g., clients), including user computers 120, 121, 122 are also connected to communications network 199 via external communication interfaces 123. ML Foresite system 100, includes servers 150, 155, 165 and clients 120, 121, 122, and databases and data sources 160, 170, 180, 190 (and other connected devices), and includes data and other computer-readable instructions and can have software applications and/or software tools executing on them.

Example Computer System

Figure 2:
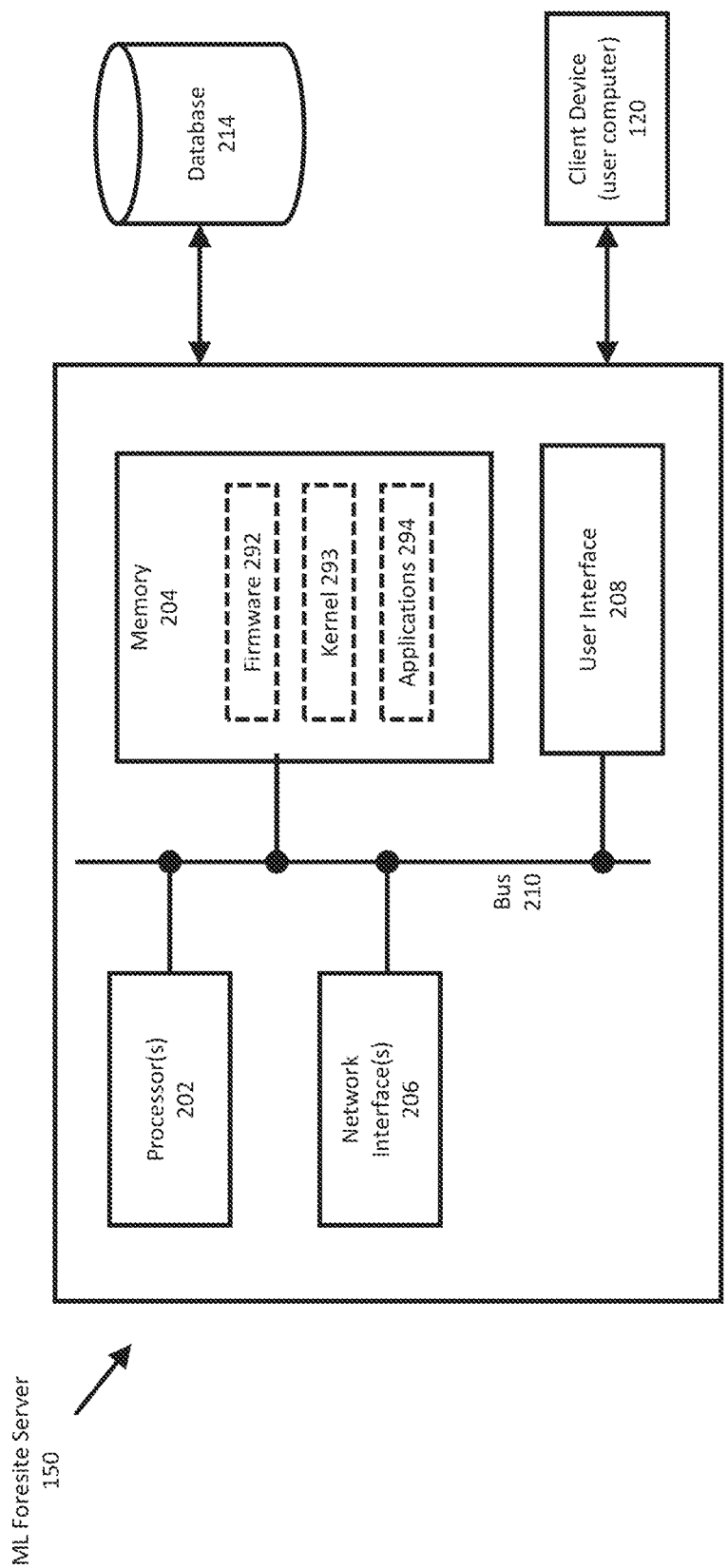
FIG. 2 is a simplified block diagram of an example computing system in which various disclosed principles of the invention can be implemented.

Components of the ML Foresite system 100 may themselves be or include hardware, software, firmware, or combinations thereof. FIG. 2 shows a simplified block diagram of an example computer (or computing) device, including a non-limiting example of the various servers, databases, and other computer systems 120, 121, 122, 150, 155, 160, 165, 170, 180, 190 shown in FIG. 1. As a non-limiting example, in FIG. 2, an ML Foresite server 150 is shown, but it should be understood that the example computer (computing) system shown in FIG. 2 can be any of computer systems 120, 121, 122, 150, 155, 160, 165, 170, 180, and 190. The computer system 150 can be configured to perform and/or can perform one or more acts and processes, such as the acts and processes described in this disclosure. As shown, the computer server 150 may include processor(s) 202, memory 204, network interface(s) 206, and an input/output unit (user interface) 208. By way of example, the components are communicatively connected by a bus 210. The bus can also provide power from a power supply (not shown).

Processors 202 may include general purpose processors and/or special purpose processors (e.g., digital signal processors (DSPs) or graphics processing units (GPUs). Processors 202 may be configured to execute computer-readable instructions that are contained in memory 204 and/or other instructions as described in this disclosure.

Memory 204 may include firmware 292, a kernel 293, and applications 294, among other forms and functions of memory. As described, the memory 204 may store machine-language instructions, such as programming code or non-transitory computer-readable storage media, that may be executed by the processor 202 to carry out operations that implement the methods, scenarios, and techniques described in this disclosure. In some examples, memory 204 may be implemented using a single physical device (e.g., one magnetic or disc storage unit), while in other examples, memory 204 may be implemented using two or more physical devices. In some examples, memory 204 may include storage for one or more machine learning systems and/or one or more machine learning models as described in this disclosure.

In some instances, the computing system 150 can execute program instructions in response to receiving an input, such as an input received via the communication (network) interface 206 and/or the user interface 208. The memory 204 can also store other data, such as any of the data described in this disclosure.

The communication (network) interface 206 can allow the computing system (Foresite server) 150 to connect with and/or communicate with another entity according to one or more protocols. In one example, the communication network interface 206 can be a wired interface, such as an Ethernet interface. In another example, the communication network interface 206 can be a wireless interface, such as a cellular or Wi-Fi interface.

The user interface 208 can allow for interaction between the computing system 200 and a user (e.g., user computer 120) of the computer system 150, if applicable. As such, the user interface 223 can include, or provide an interface connection to, input components such as a keyboard, a mouse, a touch-sensitive panel, and a microphone, and output components such as a display device (which, for example, can be combined with a touch-sensitive panel), and a sound speaker. In an example embodiment, the client device 120 may provide user interface functionalities.

The computer system 150 can also include one or more connection mechanisms that connect various components within the computer system 150. For example, the computer system 150 can include a connection mechanism 210 (bus) that connects components of the computer system 150, as shown in FIG. 2.

Network interface(s) 206 may provide network connectivity to the computer device 150, such as to the Internet or to other public and private networks. Networks may be used to connect the computer system 150 with one or more other computing devices, such as servers, clients, or other computer systems. In an example embodiment, multiple computing systems could be communicatively connected, and example methods could be implemented in a distributed fashion.

Client device 120 may be a user client or terminal that includes an interactive display, such as a GUI. Client device 120 may be used for user access to programs, applications, and data of the computing device 150 and the system 100. For example, a GUI could be used for graphical interaction with programs and applications described in this disclosure. In some configurations, the client device 120 may itself be a computing device; in other configurations, the computing system 150 may be incorporated, or may be configured to operate as, a client device.

Database 214 may include storage for input and/or output data, such as the historical viewership database 170, internal data store 180, and Foresite database 190, as well as model persistence stores 165, and/or consumer segment targeting data database 160, referenced above and described in more detail below.

In some configurations, the computer system 150 can include one or more of the above-described components and can be arranged in various ways. For example, the computer system 150 can be configured as a server and/or a client (or as a cluster of servers and/or a cluster of clients) operating in one or more server-client type arrangements, for instance. In the illustrations of FIGS. 1 and 2, data inputs and outputs, such as the databases clusters, and interfaces are included as components of the system. In other representations, these might be considered separate from the system itself, and instead viewed as elements that supply data to the system 100 and/or consume data produced by the system 100.

FIG. 1 shows an example of a system architecture and shows certain components that are usable in one or more exemplary embodiments of the invention. For example, servers 150, 155 and clients 120, 121, 122 are depicted as servers and clients only as examples and not to imply a limitation to a client-server architecture. In another exemplary embodiment of the invention, the system 100 can be distributed across several data processing (computer) systems and a data network as shown. Similarly, in another exemplary embodiment of the invention, the system 100 can be implemented on a single data processing system within the scope of the illustrative embodiments. Data processing (computer) systems 120, 121, 122, 150, 155, 160, 165, 170, 180, 190 also represent example nodes in a cluster, partitions, and other configurations suitable for implementing an exemplary embodiment of the invention.

The computers (e.g., 120, 121, 122, 150, 155, 160, 165, 170, 180, 190) can take the form of a smartphone, a tablet computer, a laptop computer, a desktop computer, a wearable computing device, or other suitable computing devices. The computers (e.g., 120, 121, 122, 150, 155, 160, 165, 170, 180, 190) can be servers, personal computers, and/or network computers. Software application programs described as executing in the system 100 in FIG. 1 can be configured to execute in user computers in a similar manner. Data and information stored or produced in another data processing system can be configured to be stored or produced in a similar manner.

Applications, such as application 294 shown on the example computer system 150 of FIG. 2, implement one or more exemplary embodiments or functions of the invention as described in this disclosure. For example, viewership training model application 294 receives a request from an application (not shown separately) on ML Foresight Server 150, including time series predictive models, and other training information. Applications of the user computer 120 and computer systems 121, 122, 150, 155, 160, 165, 170, 180, 190 implement an embodiment or a function as described to operate in conjunction with applications on the ML Foresight Server 150 and on other computer devices. As another example, an application on the consumer segment targeting data store 160 provides advanced target consumer profile information stored in model persistence stores 165 and used by a computer application on managed cluster platform 155 to process and identify advance target segment information to be sent to and analyzed by ML Foresight Server application 294. Similarly, Foresite viewership predictions computer 190 and its applications operate in conjunction with application 294 on the ML Foresight Server 150 and provide viewership predictions used by the ML Foresight Server 150 reporting application to process, identify, analyze, and report actionable viewership predictions to users 120, 121, 122 and third parties (not shown separately).

Computers 120, 121, 122, 150, 155, 160, 165, 170, 180, 190 and additional computers (e.g., clients and servers), may couple to communication network 199 using wired connections, wireless communication protocols, or other suitable data connectivity.

In the depicted example, ML Foresite server 150 may provide data, such as boot files, operating system images, and applications to user computers (clients and servers) 120, 121, 122, 150, 155, 160, 165, 170, 180, 190. Clients 120, 121, 122 may be clients to server 150 in this example. Clients 120, 121, 122 and servers 150, 155, 160, 165, 170, 180, 190, or some combination, may include their own data, boot files, operating systems, images, and applications. Computer system 100 may include additional servers, clients, and other computing devices (computer systems) that are not shown. For example, while countless users and databases can be used to provide viewership inputs to the national TV viewership models and to consumer segment viewership estimate models using systems and methods constructed according to the principles and exemplary embodiments of the invention, for clarity and brevity, one distinct computer system is shown with a single ML Foresite server 150. In addition, a managed cluster platform computer 155, and individual databases 160, 165, 170, 180, 190 are shown in FIG. 1 to facilitate the discussion of the model creation and execution.

Among other uses, system 100 may be used for implementing a client-server environment in accordance with exemplary embodiments of the invention. A client-server environment enables software applications and data to be distributed across a network such that an application functions by using the interactivity between a user computer and a server. System 100 may also employ a service-oriented architecture, where interoperable software components distributed across a network can be packaged together as coherent applications.

Together, the system 100 provides inputs for the ML Foresite server application 294 to receive, process, analyze, classify, and provide actionable intelligence and recommendations. The system 100 uses inputs from viewership measurement data 170 as a training input to television viewership models (shown in block 315 in FIG. 3) of ML Foresite server 150.

In some embodiments of the invention, the (historical) viewership measurement information stored in the database 170 may include identifier information about a media asset (e.g., channel on which the media asset was shown, genre of the media asset, actors in the media asset, etc.). The identifier information about a media asset may include demographic information (e.g., age of viewers, gender of viewers, race, of viewers, ethnicity of viewers, marital status of viewers, profession, and other information relating to a particular sector of the population.) A day of week that the media asset was generated for display may be included as well as a time of day. For example, the processors in the Foresite system servers may utilize machine learning to use the (historical) viewership measurement information to train a model 315 and to predict viewership information at a scheduled time and day of an advertising event.

Additionally, databases and data sources 120, 121, 122, 150, 155, 160, 165, 170, 180, 190 provide fast data in real-time for use in analyzing and predicting viewership results and recommendations, respectively. As inputs and results from user computers 120, 121, 122, managed cluster platform 155, ML Foresite server 150, and databases and sources of fast data 160, 165, 170, 180, 190 are received, ML Foresite server 150 and application 294 reassess and redetermine the actionable recommendations.

As will be appreciated by one skilled in the art, aspects of the disclosure may be embodied as a system, method, or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to in this disclosure as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, or any suitable combination. Computer program code for carrying out operations for aspects of the disclosure may be written in any combination of one or more programming languages, including an object-oriented programming language such as Java, Smalltalk, C++ or the like and conventional procedural programming languages, such as the "C" programming language or similar programming languages. Other types of programming languages include HTML5, Flash and other similar languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of communications network, including a local area network (LAN) or a wide area network (WAN), or the connection may be made to an external computer (for example, through the Internet using an Internet Service Provider).

Aspects of the invention are described in this disclosure with reference to flowchart illustrations and/or block diagrams of methods, apparatus (systems) and computer program products according to exemplary embodiments of the invention. Each block of the flowchart illustrations and/or block diagrams, and combinations of blocks in the flowchart illustrations and/or block diagrams, can be implemented by computer program instructions. These computer program instructions may be provided to a processor of a server, or other programmable data processing apparatus to produce a machine, such that the instructions, which execute via the processor of the server or other programmable data processing apparatus, create means for implementing the functions/acts specified in the flowchart and/or block diagram block or blocks.

These computer program instructions also may be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks. The computer program instructions also may be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

The flowchart and block diagrams, as shown in this disclosure, illustrate the architecture, functionality, and operation of possible implementations of systems, methods, and computer program products according to various exemplary embodiments of the invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the diagrams and/or flowchart illustration, and combinations of blocks in the block diagrams and/or flowchart illustration, can be implemented by special purpose hardware-based systems that perform the specified functions or acts, or combinations of special purpose hardware and computer instructions. For clarity and consistency, this disclosure describes an exemplary embodiment of an ML Foresight viewership prediction system in accordance with the invention.

Example Operation Overview

As outlined below and in FIG. 4, one example implementation of the invention incorporates systems and methods that receive a first plurality of historical television viewership training profiles 305 at an input layer 402 of a national television viewership model 315 implemented on a computing device. Each of the first plurality of historical television viewership training profiles 305 indicates respective television viewership characteristics defined for the respective historical viewership training profile 305.

In some example implementations of the invention, the first plurality of historical television viewership training profiles 305 includes a television viewership metrics file, and the television viewership metrics file can include at least one of the group of television ratings, impressions, network coverage universe estimates (UE), and estimates of a total population of viewers (UE).

In some example implementations of the invention, the first plurality of historical television viewership training profiles 305 includes temporal characteristics defined for the historical television viewership training profiles 305.

The invention transforms the plurality of historical television viewership training profiles 305 to generate multi-dimensional arrays 405, 406, 407 representing the plurality of historical television viewership training profiles 305. The systems and methods of the invention detect patterns in the generated multi-dimensional arrays 405, 406, 407, where the patterns in the generated multi-dimensional arrays 405, 406, 407 can include a subset of television viewership characteristics defined for the historical viewership training profile 305. In some example implementations of the invention, the pattern detected in the generated multi-dimensional arrays 405, 406, 407 can include temporal and television viewership characteristics defined for the historical viewership training profile. In some example implementations, the invention includes detecting patterns in an additional layer of generated multi-dimensional arrays, where the patterns in the additional layer of generated multi-dimensional arrays include a weighting characteristic between the generated multi-dimensional arrays 405, 406, 407 and the additional layer of generated multi-dimensional arrays. In one example, the pattern is characterized by a predetermined threshold value of the weighting characteristic between the generated multi-dimensional arrays 405, 406, 407 and the additional layer of generated multi-dimensional arrays.

The invention generates predicted television viewership characteristics 330 for any received television viewership input profile 305 with an output layer 412 of the national television viewership model 315. In some example implementations, the generated predicted television viewership characteristics 330 are based upon the detected patterns in the generated multi-dimensional arrays 405, 406, 407, and the predicted television viewership characteristics 330 include expected television viewership levels.

The systems and methods of the invention train the national television viewership model 315 to predict television viewership level forecasts for each respective training profile based on expected television viewership levels represented in the first plurality of historical television viewership training profiles 305.

Subsequent to training the national television viewership model 315 with the first plurality of historical television viewership training profiles 305, the systems apply the trained national television viewership model 315 to a second plurality of runtime television viewership profiles 405 to generate a set of runtime national television viewership characteristics predictions 345 for each runtime television viewership profile 405.

In some implementations of the invention, the systems will store, in non-transitory computer-readable memory, the second plurality of runtime television viewership profiles 405 and the runtime national television viewership characteristics predictions 345. In some implementations of the invention, the runtime national television viewership characteristics predictions 345 include expected viewership levels.

In some exemplary embodiments of the invention, the second plurality of runtime television viewership profiles includes temporal characteristics. The temporal characteristics can include at least one of the group of seasonal temporal characteristics and cyclical temporal characteristics.

Some implementations of the invention also include modeling suggested outputs 310 to the national television viewership model 315, using managed cluster platform 155, to determine predicted television viewership characteristics.

In some exemplary implementations of the invention, the systems and methods receive a first plurality of historical advanced target viewership training profiles 340 at an input layer 502 of an advanced target viewership model 360 implemented on a computing device. Each of the first plurality of historical advanced target viewership training profiles 340 indicating respective advanced target viewership characteristics defined for the respective historical advanced target viewership training profile.

In some example implementations of the invention, the first plurality of advanced target viewership training profiles 340 includes an advanced target viewership metrics file, and the advanced target viewership metrics file can include at least one of the group of television ratings, impressions, network coverage universe estimates (UE), and estimates of a total population of viewers (UE).

In some example implementations of the invention, the first plurality of advanced target viewership training profiles 340 includes temporal characteristics defined for the advanced target viewership training profiles 340.

The invention transforms the plurality of historical advanced target viewership training profiles 340 to generate tensors 505, 506, 507 representing the plurality of historical advanced target viewership training profiles 340. The systems and methods of the invention detect patterns in the generated tensors 505, 506, 507, where the patterns in the generated tensors 505, 506, 507 can include a subset of advanced target viewership characteristics defined for the historical advanced viewership training profile 340. In some example implementations of the invention, the pattern detected in the generated tensors 505, 506, 507 can include temporal and advanced target viewership characteristics defined for the advanced target viewership training profile 505. In some example implementations, the invention includes detecting patterns in an additional layer of generated tensors, where the patterns in the additional layer of generated tensors include a weighting characteristic between the generated tensors 505, 506, 507 and the additional layer of generated tensors. In one example, the pattern is characterized by a predetermined threshold value of the weighting characteristic between the generated tensors 505, 506, 507 and the additional layer of generated tensors.

The invention generates predicted advanced target viewership characteristics 365 for any received advanced target viewership input profile 340 with an output layer 512 of the advanced target viewership model 360. In some example implementations, the generated predicted characteristics 365 are based upon the detected patterns in the generated tensors 505, 506, 507, and the predicted advanced target viewership characteristics 365 include expected viewership levels of the advanced targets.

The systems and methods of the invention train the advanced target viewership model 360 to predict advanced target viewership forecasts for each respective training profile based on expected television viewing viewership levels represented in the first plurality of historical advanced target viewership training profiles 340.

Subsequent to training the advanced target viewership model 360 with the first plurality of historical advanced target viewership training profiles 340, the systems apply the trained advanced target viewership model 360 to a second plurality of advanced target viewership runtime profiles 505 to generate a set of runtime advanced target viewership characteristics 365 for each runtime advanced target viewership profile 505.

In some implementations of the invention, the system will store, in non-transitory computer-readable memory, the second plurality of advanced target runtime profiles 505 and the runtime advanced target viewership characteristics predictions 365. In some implementations of the invention, the runtime advanced target viewership characteristics predictions 365 include expected viewership levels.

In some exemplary embodiments of the invention, the second plurality of advanced target runtime profiles 505 includes temporal characteristics. The temporal characteristics can include at least one of the group of seasonal temporal characteristics and cyclical temporal characteristics.

Some implementations of the invention also include modeling suggested outputs 355 to the advanced target viewership model 360, using new consumer segments and target demographic data 350, to determine runtime advanced target viewership characteristics 365.

Some exemplary embodiments of the invention also aggregate the predicted set of runtime advanced target viewership characteristics 365 with estimates of advanced target viewership segments 370 from an ad sales system 372. In some example systems, the predicted set of runtime advanced target viewership characteristics 365 is aggregated, and the system creates advertising optimization estimates 390 with a campaign planning optimization engine 392 for an advertising campaign plan. Is some exemplary embodiments, the systems aggregate the predicted set of runtime advanced target viewership characteristics 365 and re-train the advanced target viewership model 360 with new incoming advanced target viewership data 355 to provide updated pacing forecasts 380 for use during a campaign stewardship process 382.

Example System Operation

Figure 3:
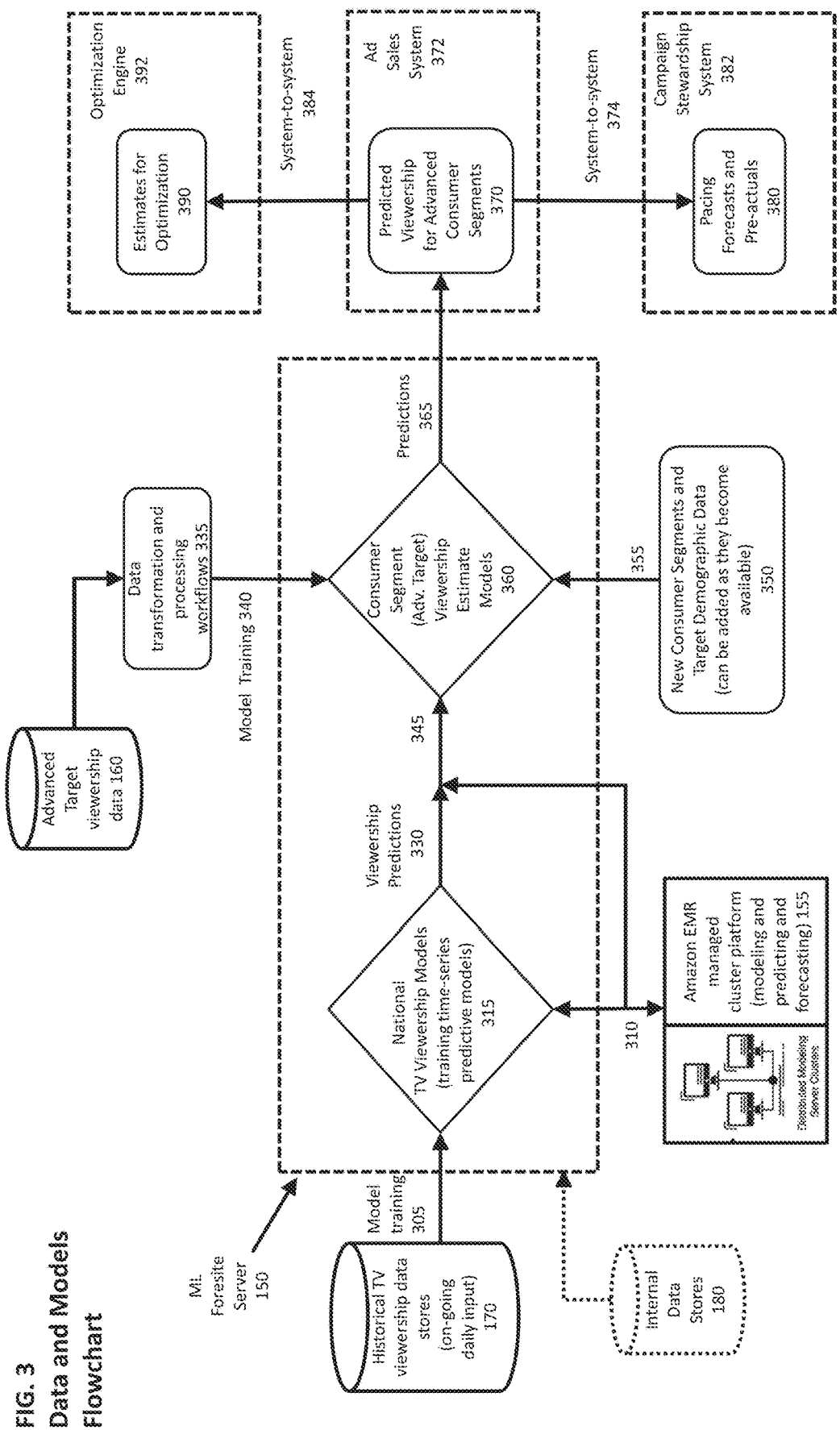
FIG. 3 illustrates an example data and model flowchart in accordance with the invention showing a flow of data through a model training and prediction process in accordance with the invention.

FIG. 3 (Data and Models Flowchart) illustrates flow of data through a model training and predictions process. The viewership estimates models are trained using historical consumer segments and TV viewership data, which are ingested and then go through various workflows for data transformation and processing before being used for model training. When new consumer segments become available to the system for viewership prediction, data pertaining to these segments are then combined with separately modeled national TV viewership projections. This combined data is then fed into the viewership estimates models to create predictions of viewership specific to the advanced consumer segment.

In example embodiments, an ML Foresite consumer segment viewership prediction system 100 may be operated by a media content provider in order to add value to a media company that obtains media assets (e.g., videos, television programs, streaming content, and other media assets) from asset providers and distributes them to end users. Content includes electronically consumable user assets, such as television programming, pay-per-view programs, on-demand programs, Internet content (e.g., downloadable content, streaming content, webcasts, etc.), video clips, audio clips, pictures, rotating images, documents, playlists, articles, books, electronic books, websites, blogs, advertisements, social media, applications, games, and other media or multimedia combinations of media assets.

Additionally, or alternatively, a media distributor may operate an ML Foresite consumer segment viewership prediction system 100 to add value to media content obtained from its media content providers. Other implementations and embodiments are possible. It should be understood that the example operation described in this disclosure of example ML Foresite consumer segment viewership prediction systems is not intended to limit the contexts in which the example systems may be implemented and operated.

The details of the invention can be illustrated by first discussing the methods and data involved in forecasting national viewership impressions (i.e., one form of television viewership metric) for a set of cable television networks. These national impression forecasts are then used as inputs into models trained specifically to predict Advanced Target viewership impressions on the same cable networks, which leads to a discussion of Advanced Target Viewership Forecasting. We then conclude with a discussion of a couple uses of these forecasted outputs.

Training Mode of Operation

The ML Foresite consumer segment viewership prediction system 100 may operate in a training mode and/or a runtime mode. FIG. 3 illustrates information and models flow that occurs on the various computer systems of the ML Foresite prediction system 100 during the modes of operation. The ML Foresite prediction system 100 includes two sets of machine learning models, namely the national TV viewership models 315 and the consumer segment (advanced target) viewership estimate models 360.

National Viewership Forecasting

The end goal is to provide methods to predict TV viewership of narrowly defined consumer segments, or Advanced Targets, at a given point of time in the future ($t_n$) on a particular television network. One important input into that estimation method is the total national viewership level that will potentially occur at that future time $t_n$ and network. In this example, the viewership metric is Impressions, but in other examples the viewership metrics may include ratings, reach, network coverage universe estimates UE, estimates of a total population of viewers (UE), and other alternative viewership metrics and audience measurements. This metric of national Impressions is important for two reasons. (1) It provides the saturation level, or maximum number of impressions, that will occur at $t_n$, and (2), as total national and Advanced Target viewership is correlated, National viewership forecasts can provide a signal that can accordingly inflate or deflate Advanced Target viewership.

The system 100 provides inputs for the ML Foresite server application 294 to receive, process, analyze, classify, and provide actionable intelligence and recommendations. The system 100 uses inputs from viewership measurement data 170 as a training input to television viewership models (shown in block 315 in FIG. 3) of ML Foresite server 150.

Training Data

As shown in FIG. 3, the process begins with several years' worth of historical national viewership Impressions data at a daily level of granularity for each of our television networks. These viewership data can be stored in historical TV viewership data stores 170, for example. These data stores 170 can include Nielsen Daily Ratings, Comscore measures, and GfK data and analytics, as well as other media analytics measures. The Nielsen ratings can include daily COV UE and UE measures. COV UE is the Coverage Universe Estimate, which is the total number of households having access to a given television network (e.g., number of subscribers to a cable television network). UE is the Universe Estimate, which is the total number of households and persons within the designated viewership characteristic. The inputs into these National TV Viewership Models are mostly based on the time series (time and seasonality components) characteristics associated with the above collected metrics. However, they can also include other signals of general national TV viewership patterns including national economic data, viewership metrics for other non-television media platforms, and other signals of general national TV viewership patterns.

The historical national viewership data can also include standard commercial and live ratings data as input variables, as well as time shifted viewing, unique viewers (reach), average audiences (AA %), persons or households using TV (PUT/HUT), and various deconstructed cuts of data. To supplement the TV rating inputs, the invention also uses marketing spend measures and other available program characteristics. In addition to program characteristics, program performance, promotional support factors, audience engagement, and social network behavior may also be used as inputs to the training model.

Two types of historical national viewership data are modeled for use in forecasting. The first is an estimate of the total number of households that have access to a given television network (i.e., the number of households that subscribe to a cable or satellite service that carries that network) ("Network Subscriber Universe" or NSU). The second national viewership data type is the daily-minutely average total impressions occurring on a network ("Network Total Daily Impressions" or NTDI). When viewed historically, changes in the NSU provide more gradual signals of overall viewership growth and declines, which can have a requisite impact on the levels of Advanced Target viewership. NTDI provides a more cyclical and seasonal signal of overall viewership patterns, which impacts Advanced Target viewership estimates as well accordingly.

Time Series Modeling Methods

Because the training data are structured in consecutive daily aggregations over the course of several years, the forecasting of both ("Network Subscriber Universe") NSU and ("Network Total Daily Impressions") NTDI lend themselves well to time series regression techniques. The invented systems are flexible in their ability to use a variety of time series regression techniques, from well-established statistical forecasting modeling techniques such as Autoregressive Integrated Moving Average (ARIMA) to decomposable time series models that account for seasonality and trends with changepoints, as trends in television viewership change quite often. The systems and methods of the invention can also utilize penalized regression, multiple adaptive regression splines, random decision forests, support vector machines, neural networks, and gradient boosting machine to achieve combinations of accuracy and scalability. Essentially, the systems of the invention allow for the best performing time series model algorithm to be selected based on minimizing an error metric. In block 305, the selected model 315 is trained on daily NSU and NTDI data to predict future daily levels accounting for recent trends in viewership growth or decline, and seasonal trends (e.g., higher TV viewership during the holiday season, in certain quarters, on certain days of week, etc.).

In evaluating the models, the data was split into training, test, validation sets. The test sets are randomly selected observations throughout the time series used to inform model training. The validation set is selected as a number of observations with the latest dates of the time series, and used to validate or measure the error associated with the trained model predicting into future dates not included in the training data. The models learn by making future predictions based on the training set, testing those predictions on the testing and validation sets, and repeating the process multiple times using different model tuning parameters, including the number of lag variables or differencing variables, etc., until a model with the lowest measure of error is selected. The training parameters can be selected to address the results of the validation and to help limit the tendency to overfit the model to the training set, which often reflects patterns that are unlikely to continue into the future. The training parameters can also be selected to more aggressively or more conservatively fit the parameters with which to apply to a new dataset. The parameters can be adjusted and/or reused to leverage the most current and the most complete information available.

Forecasted Data Structures

The trained NSU and NTDI models then require only future dates (inferring from those dates the cyclical and seasonal features) as inputs to output forecasts of daily future NSU and NTDI levels. As forecasted outputs carry additional uncertainty further into the future due to, among other things, unknown future trend changepoints, in practice NSU and NTDI is typically forecasted only as far into the future as is needed to facilitate ongoing transactions for Advanced Target linear television advertising campaigns.

Continuing in FIG. 3, when the ML Foresite system is in training mode, the national TV viewership models 315 receive training data from data stores 170 and are trained to provide viewership predictions 320. Then, in runtime mode, these viewership predictions 320 are used as inputs, along with historical consumer segment viewership data 160 and new consumer segments 350 to the consumer segment (advanced target) viewership estimate models 360 in order to train these models 360. In runtime mode, the output of the consumer segment (advanced target) viewership estimate models 360 is a predicted viewership for advanced consumer segments 370.

As above, in training mode, the ML Foresite system 100 may be "trained" to recognize examples of historical TV Viewership on an on-going daily basis. In runtime mode, the ML Foresite system 100 may operate to predict national TV viewership (projected national ratings) 330 and to select a "best" projection. Those projected national ratings 330 are stored (in internal data stores 180, for example) along with advanced target forecasts, the forecasting process of which is described below.

The system 100 uses models of historical TV viewership data stores 170, historical consumer segment viewership data 160, and new consumer segment and target demographic data 350 to further train the consumer segment (advanced target) viewership estimate models 360 to more accurately predict the viewership of advanced target consumer segments. Additionally, projected national tv viewership forecasts 330 are used as an additional signal or feature for training these advanced target viewership forecasting models 360. Projections by these models 315 aid in the accuracy of the advanced target viewership predictions. Modelling may occur using managed cluster platform 155 to parse relevant data, extract relevant data, model or weigh the extracted/input data to determine suggested output(s), including outputs 310.

Custom Consumer Segments ("Advanced Targets") Viewership Forecasting

The previous section discussed the modeling and forecasting of National TV viewership, specifically in the form of the NSU and NTDI daily metrics. The NSU is an estimate of the total number of households that have access to a given television network (i.e., the number of households that subscribe to a cable or satellite service that carries that network). The NTDI is the daily-minutely average total impressions occurring on a network. As shown in FIG. 3, these projections then serve as inputs 330, 345 into models (e.g., consumer segment (advanced target) viewership estimate models 360) that are trained to predict Advanced Target viewership. There are a few different component data types that are used to train these models.

Training Data

Historical National TV Viewership data includes historical "Network Subscriber Universe" (NSU) and "Network Total Daily Impressions" (NTDI) that are leveraged and blended with additional data to train the advanced target viewership models 360. In this case, though, the NSU and NTDI serve as signals of Network viewership (i.e., larger networks have larger NSU and NTDI, and therefore likely will have larger Advanced Target viewership, if all else is equal).

In addition to historical national TV viewership measures, the training data for Advanced Target viewership models includes (new) Consumer Segments and Advanced Target Demographic Data from database 350. Advanced targets are essentially lists of people or households who, as a group, are deemed by an advertiser as a target audience (e.g., people in the market to buy a car, as described previously). The given consumer segments are described using a variety of measures, which include demographic characteristics such as percentage (of the advanced target) that are male and female, percentages of various ethnic origins, regionality characteristics such as percentage that live in a large metropolitan city, income, and behavioral characteristics, etc. These measures are used in making forecast determinations. Once the list of consumers is determined, this list may be matched securely and anonymously to national databases of consumers so that indexes for demographic and other characteristics such as those described above can be calculated for the Advanced Target. These indexes are calculated against the U.S. national percentage of a given demographic (or other) characteristic. The demographic categories used and calculated by the system are numerous and include gender, regionality, and income brackets, among many other demographic groupings.

For example, an advanced target example may be a list of persons in the market to buy a car, and for purposes of ease, we may call them "Potential Car Buyers". This group of Potential Car Buyers may index highly in the middle income brackets, e.g. 20% of Potential Car Buyer households may garner incomes between $75,000 to $100,000 annually, vs. the national percentage of households making that income which is 12%. Taking the ratio of 0.20/0.12=1.67, the middle-income-index for Potential Car Buyers. Such indexes may also be calculated for other demographic characteristics such as percentage male, female, age brackets, etc., as well as other behavioral characteristics, which may be measured for both the advanced targets and for the national population. Indices of 1 represent matching exactly the national average, whereas indices greater than or less than 1 represent an Advanced Target as being more or less aligned with the national average. These indices correlate with advanced target viewership on different networks, whose typical viewers also index differently depending on the network and content aired on those networks.

The training data for the consumer segment (advanced target) viewership estimate models 360 also include Historical Advanced Targets TV Viewership data (from database 160, for example). Statistical panel-based TV viewership measurement data has been reported historically in terms of age and gender. Taking a similar framework, but instead segmenting the panelists in terms of the Advanced Target demographic characteristics described above with regard to consumer segments (advanced targets) has made it possible to measure the TV viewership of Advanced Targets. Thus, we have access to historical Advanced Target viewership data on our TV networks for each of the Advanced Targets we have transacted on, going back several years. This viewership data is of higher time granularity than the National TV viewership data described above. The Advanced Target viewership data is aggregated at total impressions for each 15-minute increment occurring every day across five quarters per advanced target, broken out by each network. Additionally, it is broken out by the same age and gender sub-categories as often used for linear television.

Each of the three categories of data (historical national TV viewership data, consumer segments (advanced targets) demographic data, and historical advanced targets TV viewership data) is joined together to ultimately create a large historical data set of 15-minute increment levels of viewership impressions for Advanced Target audiences, with each of those instances associated with the demographic characteristics of the Advanced Target audience in question, and the daily levels of total national viewership on the given network.

Machine Learning Modeling Methods

As the size of the above-mentioned training data is large and growing, a cloud-based architecture is employed, allowing for automatic scaling of computational resources, and leveraging a distributed modeling approach across computational clusters, as needed.

A central cloud server, which can be a part of Foresite server 150 or a separate but connected server, controls various scheduled jobs related to new data ingestion, processing of raw data, blending of disparate data sets, feature engineering, and general data preparation for modeling. Once the above-referenced data has been fully processed for modeling, the Foresite server 150 fires up a cluster of servers 155 to handle the training 310 of the advanced target viewership models 360.

Separate models are trained for each age and gender sub-bracket of Advanced Target viewership. For example, there are separate models trained for Advanced Target viewership for Females 18-25, Males 18-25, Females 26-29, etc. In one example embodiment, the level of aggregation of the dependent variable for each model is as follows: 15-minute-level aggregations of impressions for members of an Advanced Target who fall into a set of standard (for the TV advertising industry) and mutually exclusive age/gender sub-brackets.

Data preparation tasks and feature engineering are carried out to prepare the features for modeling. The underlying model predictors include the consumer segment demographic indices associated with each historical Advanced Target, the historical daily national TV viewership levels for each network, and other time-based seasonality and time-series features. Additionally, features may be transformed via calculations such as log transforms, standardization, min-max scaling, etc. that make the underlying patterns and correlations more easily digestible to an ML prediction model.

Because the distribution of impressions in the dependent variable may be zero-inflated, and such zeros and non-zero values tend to be time-dependent, the systems and methods of the invention account for this by building an ensemble of classification and regression model types that work together to predict whether a given time slot is a zero- or non-zero-slot, and if it is non-zero, to then provide the forecasted impression value.

As with the National Viewership Forecasting time series modeling methods, the invented systems are flexible in their use of regression and classification algorithms. The ultimate choice of algorithm for this task is based on minimizing an error metric, as well as optimizing runtime speed.

Runtime Mode of Operation

During runtime operation of the ML Foresite viewer system 100, once the models 315, 360 have been trained, the models 315, 360 then may be used in combination with the historical viewership data from stores 170 to forecast viewership into the future for new Advanced Targets. These national TV viewership models 315 may be used to make viewership predictions 320 to provide national viewership forecasts 325 that may further be used in consumer segment (advanced target) viewership estimate models 360. Additionally, to support more accurate predictions, the managed cluster platforms 155 may further model these national viewership forecasts 325 or provide newer models using ANN to output 345 updated and more accurate national viewership forecasts 325 that are again used by the consumer segment (advanced target) viewership estimate models 360.

Data Inputs/Uses of Forecasted Outputs

The consumer segment (advanced target) viewership estimate model 360 uses updated new consumer segment and target demographic data 350 at the input 355 of the model 360 to estimate predicted viewership 365 for advanced consumer segments 370. These new consumer segment and target demographic data 350 at input 355 of the model 360 can include a new target's demographic indices, future dates to be forecasted into, and forecasted NSU and NTDI values for those future dates. Using these data inputs 355, the invented system provides forecasted Advanced Target impressions 365 for the given future dates at 15-minute-level aggregations for each of the discussed age/gender sub-brackets. In this way, the ad sales system 372 may predict viewership more accurately at shorter time periods and thus more accurately charge advertisers for times and programming. The predicted viewership for advanced consumer segments 370 also may be sent system-to-system 374 and 384 to provide pacing forecasts and pre-actuals 380 and for use by campaign stewardship systems 382 and to provide optimization estimates 390 for use by optimization engines 392.

The campaign stewardship systems 382 may provide users with information on the performance of ongoing and past ad campaigns, and allow users to adjust campaign schedules on a moving-forward basis based on models retrained on the latest viewership data. This information was not previously available to users in a timely or automated fashion, but instead required cumbersome searches and downloads from multiple data sources, and rudimentary calculations based in part on human judgment. The invented systems and methods allow users to forego these time-consuming tasks, relying on the system-provided updated estimates.

The optimization engine 392 provides users with the ability to build television advertising campaigns using the predicted Advanced Target Viewership forecasts as inputs. Improvements to the precision of forecasts allows the optimization engine to build advertising campaigns that ultimately deliver closer to what was predicted, and this effect carries over to providing more efficient plans overall than those based on the incumbent forecasting methods.

As illustrated in FIG. 3, the sub-bracketed viewership aggregations 330, 340, 345, 355 can be summed together or otherwise aggregated as needed to provide predictions 365 and estimates of Advanced Target viewership for age/gender segments 370 that TV advertisers may demand (e.g., Persons 18+ within the Advanced Target) as part of ad sales system 372. These estimates 370 are typically used at the beginning of an advertising campaign to build campaign plans within a campaign planning optimization engine 392. As a campaign runs (a period called "campaign stewardship"), it is also necessary to update predictions 390 using more recent data. The models 315, 360 are regularly retrained using new incoming Advanced Target viewership data 350 to provide updated predictions for pacing, forecasts, and pre-actuals 380 for use during the stewardship process 382.

Other Example Implementations of System

In addition to the ML Predictor systems 100 as shown in FIG. 1 particular example implementations of this system include artificial neural networks (ANNs) that function to extract advanced viewership consumer segments, demographic information, pacing forecasts, and other viewership characteristics. Each of these particular implementations is described in terms of example operations described below.

An artificial neural network (ANN) may be computationally constructed as a plurality of interconnected layers, including an input layer, an output layer, and one or more intermediate layers. Each layer may be made up of one or more nodes having inputs and outputs. The inputs of nodes in one layer may be connected to the output of nodes of the preceding layer, except that the inputs to the nodes of the input layer receive input data, and the outputs of the nodes of the output layer provide a prediction that the input data matches one or another type of pattern that the ANN has been trained to recognize. Typically, training for recognition of a particular class of content in a given type of data, such as cats or dogs in image data or viewer measures in television ratings data, may involve inputting training data that represents known (training) examples of the particular class of content, and then adjusting parameters (or weights) of the nodes in a feedback-like procedure to maximize a probability that a predicted output by the ANN output (e.g., what the ANN "thinks" the input data represents) matches the training examples.

The input layer may be mapped with standard national viewership attributes, as well as advanced target characteristics, as known, such as age range, gender, children, education level, occupation, salary, geographic location/region, watch times, dates, programs, networks, ethnicity, language fluency, etc. The hidden layer provides a weighting to each to make projections through the ANN, and the output layer provides advanced target viewership predictions to suggest to users potential matching programming, programming showtimes, advertising audience targets, etc.

In general, the predicted viewership for advanced consumer segments 370 may be used to make more accurate predictions on viewership, optimization, and better pacing and suggestions for programming to monetize advanced targets.

Systems and methods in accordance with the invention create new viewership estimates to drive linear ad schedule optimizations. The systems and methods use machine learning techniques to predict granular-level television viewership metrics for consumer segments measurable at national levels. The systems and methods provide capabilities beyond estimating and forecasting television viewership for age- and gender-based demographic segments. They accurately estimate viewership for consumer segments, including behavioral, demographic, and other segmentation techniques and provide reliable viewership predictions. The systems model viewership by training an ensemble of machine learning models using historical consumer segments data and TV viewership data. The models work in concert to create viewership predictions, which are ingested, transformed, and processed and then used for advertising sales based on predicted viewership for advanced segments, for pacing forecasts and pre-actuals in a campaign stewardship program, and for further model training in an optimization engine.

The claimed invention is:

1. A method comprising:
receiving a first plurality of historical television viewership training profiles at an input layer of a national television viewership model implemented on a computing device, each of the first plurality of historical television viewership training profiles indicating respective television viewership characteristics defined for the respective historical viewership training profile;
transforming the first plurality of historical television viewership training profiles to generate multi-dimensional arrays representing the first plurality of historical television viewership training profiles;
detecting patterns in the generated multi-dimensional arrays, wherein the patterns in the generated multi-dimensional arrays include a subset of television viewership characteristics defined for the first plurality of historical viewership training profiles;
generating predicted television viewership characteristics for any received television viewership input profile with an output layer of the national television viewership model, wherein the generated predicted television viewership characteristics are based upon the detected patterns in the generated multi-dimensional arrays and wherein the predicted television viewership characteristics include expected television viewership levels;
training the national television viewership model to predict television viewership level forecasts for each respective training profile based on expected television viewership levels represented in the first plurality of historical television viewership training profiles; and
subsequent to training the national television viewership model with the first plurality of historical television viewership training profiles, applying the trained national television viewership model to a second plurality of runtime television viewership profiles to generate a set of runtime national television viewership characteristics predictions for each runtime television viewership profile.

2. The method of claim 1,
wherein first plurality of historical television viewership training profiles includes a television viewership metrics file, and
wherein the television viewership metrics file includes at least one of television ratings, impressions, network coverage universe estimates, or estimates of a total population of viewers (UE).

3. The method of claim 1, wherein the first plurality of historical television viewership training profiles includes temporal characteristics defined for the historical television viewership training profiles.

4. The method of claim 1, wherein the second plurality of runtime television viewership profiles includes temporal characteristics.

5. The method of claim 4, wherein the temporal characteristics include at least one of seasonal temporal characteristics or cyclical temporal characteristics.

6. The method of claim 1, wherein the runtime national television viewership characteristics predictions include expected viewership levels.

7. The method of claim 1 further comprising:
modelling, using managed cluster platform, suggested outputs to the national television viewership model, to determine predicted television viewership characteristics.

8. The method of claim 1, wherein the pattern detected in the generated multi-dimensional arrays includes temporal and television viewership characteristics defined for the historical viewership training profile.

9. The method of claim 1 further comprising:
detecting patterns in an additional layer of generated multi-dimensional arrays,
wherein the patterns in the additional layer of generated multi-dimensional arrays include a weighting characteristic between the generated multi-dimensional arrays and the additional layer of generated multi-dimensional arrays.

10. The method of claim 7, wherein the pattern is characterized by a predetermined threshold value of the weighting characteristic between the generated multi-dimensional arrays and the additional layer of generated multi-dimensional arrays.

11. A method comprising:
receiving a first plurality of historical advanced target viewership training profiles at an input layer of an advanced target viewership model implemented on a computing device, each of the first plurality of historical advanced target viewership training profiles indicating respective advanced target viewership characteristics defined for the respective historical advanced target viewership training profile;
transforming the first plurality of historical advanced target viewership training profiles to generate tensors representing the first plurality of historical advanced target viewership training profiles;
detecting patterns in the generated tensors, wherein the patterns in the generated tensors include a subset of advanced target viewership characteristics defined for the first plurality of historical advanced viewership training profiles;
generating predicted advanced target viewership characteristics for any received advanced target viewership input profile with an output layer of the advanced target viewership model, wherein the generated predicted characteristics are based upon the detected patterns in the generated tensors, and wherein the predicted advanced target viewership characteristics include expected viewership levels of the advanced targets;
training the advanced target viewership model to predict advanced target viewership forecasts for each respective training profile based on expected television viewing viewership levels represented in the first plurality of historical advanced target viewership training profiles; and
subsequent to training the advanced target viewership model with the first plurality of historical advanced target viewership training profiles, applying the trained advanced target viewership model to a second plurality of advanced target viewership runtime profiles to generate a set of runtime advanced target viewership characteristics for each runtime advanced target viewership profile.

12. The method of claim 11 wherein:
the first plurality of advanced target viewership training profiles includes an advanced target viewership metrics file, and wherein the advanced target viewership metrics file includes at least one of television ratings, impressions, network coverage universe estimates, or estimates of a total population of viewers (UE).

13. The method of claim 11 wherein:
the first plurality of advanced target viewership training profiles includes temporal characteristics defined for the advanced target viewership training profiles.

14. The method of claim 1, wherein:
the second plurality of advanced target runtime profiles includes temporal characteristics.

15. The method of claim 14, wherein:
the temporal characteristics include at least one of seasonal temporal characteristics or cyclical temporal characteristics.

16. The method of claim 11, wherein:
the runtime advanced target viewership characteristics predictions include expected viewership levels.

17. The method of claim 11 further comprising:
modeling, using new consumer segments and target demographic data, suggested outputs to the advanced target viewership model, to determine runtime advanced target viewership characteristics.

18. The method of claim 11, wherein:
the pattern detected in the generated tensors includes an advanced target viewership characteristic defined for the advanced target viewership training profile.

19. The method of claim 11 further comprising:
detecting patterns in an additional layer of generated tensors, wherein the patterns in the additional layer of generated tensors include a weighting characteristic between the generated tensors and the additional layer of generated tensors.

20. The method of claim 19, wherein:
the pattern is characterized by a predetermined threshold value of the weighting characteristic between the generated tensors and the additional layer of generated tensors.

21. The method of claim 11 further comprising:
aggregating the predicted set of runtime advanced target viewership characteristics with estimates of advanced target viewership segments from an ad sales system.

22. The method of claim 11 further comprising:
aggregating the predicted set of runtime advanced target viewership characteristics; and
creating advertising optimization estimates with a campaign planning optimization engine for an advertising campaign plan.

23. The method of claim 11 further comprising:
aggregating the predicted set of runtime advanced target viewership characteristics; and
re-training the advanced target viewership model with new incoming advanced target viewership data to provide updated pacing forecasts for use during a campaign stewardship process.

\* \* \* \* \*

UNITED STATES PATENT AND TRADEMARK OFFICE
CERTIFICATE OF CORRECTION

PATENT NO. : 11,979,623 B2
APPLICATION NO. : 17/540932
DATED : May 7, 2024
INVENTOR(S) : Diana Saafi Page 1 of 1

It is certified that error appears in the above-identified patent and that said Letters Patent is hereby corrected as shown below:

In the Claims

In Column 25, Line 48, after "wherein" insert --the--

Signed and Sealed this
Twenty-third Day of July, 2024

Katherine Kelly Vidal
*Director of the United States Patent and Trademark Office*